Figure 1:
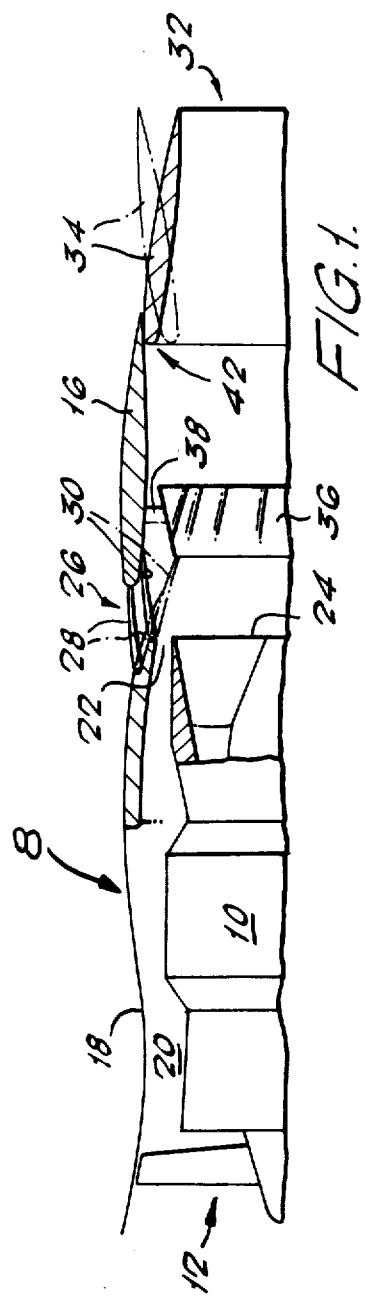

United States Patent [19]

Rodgers et al.

[11] 4,052,847
[45] Oct. 11, 1977

[54] GAS TURBINE ENGINE GAS FLOW DUCTS

[75] Inventors: Leonard John Rodgers, Spondon; Alan Stuart, Ashby-de-la-Zouch, both of England

[73] Assignee: Rolls-Royce Limited, London, England

[21] Appl. No.: 654,169

[22] Filed: Feb. 2, 1976

[30] Foreign Application Priority Data

Feb. 14, 1975 United Kingdom .............. 6321/75

[51] Int. Cl.² .......................... F02K 3/06; F02K 1/02
[52] U.S. Cl. ............................. 60/262; 60/269; 60/271; 239/265.17
[58] Field of Search ............ 60/262, 263, 271, 269; 239/265.17

[56] References Cited

U.S. PATENT DOCUMENTS

| | | | |
|---|---|---|---|
| 3,409,228 | 11/1968 | Mehr | 239/265.17 |
| 3,579,993 | 5/1971 | Tanner | 60/262 |
| 3,610,533 | 10/1971 | Johnson et al. | 60/262 |
| 3,655,009 | 4/1972 | Hilbig | 239/265.17 |
| 3,696,617 | 10/1972 | Ellis | 60/262 |
| 3,806,035 | 4/1974 | Calder | 239/265.17 |

Primary Examiner—Carlton R. Croyle
Assistant Examiner—Robert E. Garrett
Attorney, Agent, or Firm—Cushman, Darby & Cushman

[57] ABSTRACT

A ducted fan gas turbine engine power plant has an augmenter air intake and a flow mixer for selectively mixing the augmenter air with the remaining engine flows.

10 Claims, 2 Drawing Figures

U.S. Patent  Oct. 11, 1977  4,052,847

GAS TURBINE ENGINE GAS FLOW DUCTS

This invention concerns gas turbine engine power plant gas flow ducts.

Gas turbine engine power plants are provided with flow ducts through which flows, depending on the type of gas turbine engine power, plant, e.g., simple hot gas producing engine power plant or by-pass or ducted fan gas turbine engine power plant, all of which terms are well known in the art, hot gas, cold by-pass or fan air or a mixture of some or all thereof.

It is known to mix augmentation air with the hot gas stream of a gas turbine engine power plant, or with the pre-mixed flow of by-pass air and hot gases from the by-pass duct and core gas generator of a ducted fan engine power plant, the mixing being achieved by the passage of augmenter air between lobes formed on the periphery of a cylinder positioned in the flow stream and fan air and/or gas flowing through those lobes. However, in known arrangements, when augmenter air is not required, severe powerplant performance losses are experienced because lack of augmenter air flow between the lobes allows too rapid expansion of the flow of gas and/or air flows through the lobes once they exit from the cylindrical member, which in turn allows recirculation of the flows with resultant thrust loss.

If is an object of this invention to provide a flow mixing arrangement for a gas turbine engine power-plant, which arrangement at least considerably reduces recirculation and thrust losses.

Accordingly the present invention comprises a ducted fan gas turbine engine power plant exhaust flow duct having a closable augmenter air intake within its length and a flow mixing device downstream of said augmenter air intake, said flow mixing device comprising a generally annular shaped member mounted coaxially within said exhaust flow duct in radially spaced apart relationship therewith, and having lobes formed in its downstream periphery, which lobes are positioned so that in one operating mode of the exhaust flow duct, said lobes receive only ambient air therebetween, via said augmenter air intake and a mixed flow of fan air and hot gas therethrough and in a further operating mode of the exhaust flow duct, the ambient air is excluded and said lobes receive therebetween fan air from a ducted fan with which, in both operating modes, said exhaust flow duct is connected in flow series.

The invention includes a ducted fan gas turbine engine power plant having an exhaust flow duct wherein a closable augmenter air intake is situated which exhaust flow duct contains a substantially cylindrical flow mixing device which is coaxially mounted in the exhaust flow duct in radially spaced apart relationship therewith downstream of the augmenter air intake, the mixer device having a lobed downstream periphery between which lobes in one operating mode of the exhaust flow duct, ambient air passes via said augmenter air intake and between which lobes in a further operating mode of the exhaust flow duct, fan air from the ducted fan passes.

Figure 2:
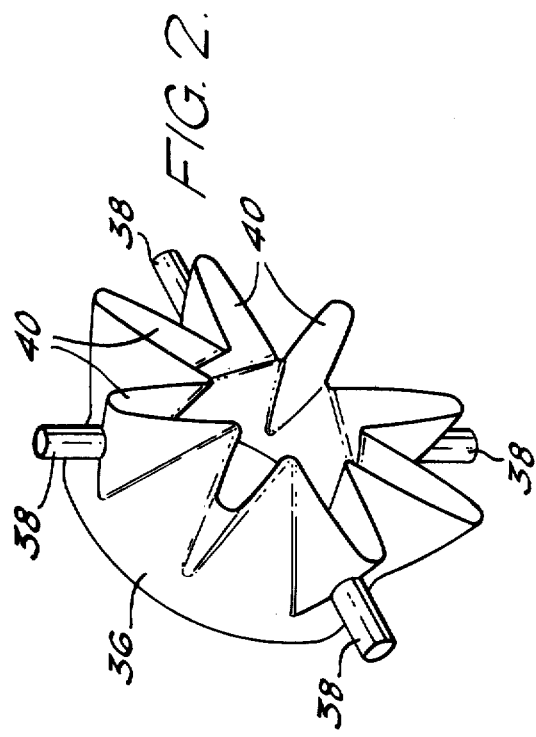

The invention will now be described by way of example, with reference to the accompanying drawings in which:

FIG. 1 is a diagrammatic longitudinal cross-section through a gas turbine engine power plant and jet pipe, and FIG. 2 is a pictorial part view of the jet pipe of FIG. 1.

Throughout this specification, the terms 'upstream' and 'downstream' refer to the normal direction of flow of air and/or gases through the gas turbine engine.

In FIG. 1 a ducted fan gas turbine engine power plant generally designated at 8 includes a stage of fan blades 12 which, with a core gas generator 10, are enclosed in an elongate casing 14 which extends beyond core gas generator 10 in a downstream direction so as to form exhaust duct 16. The upstream portion 18 of casing 14 forms, with the core gas generator 10, a duct 20 through which flows air which has been acted upon by fan stage 12. Duct 20 terminates at 22 on substantially the same plane as the hot gas outlet 24 of core gas generator 10.

An annular augmenter air intake 26 is provided in the exhaust duct 16 of casing 14 and spans the axial space between the plane of the respective fan duct and engine air and gas outlets and a flow mixing device 26 which is situated in exhaust duct portion 16. The radially outer end of intake 26 is closed by pivotal flap members 28 arranged peripherally of the casing 14 and the radially inner end of intake 26 is closed by pivotal flap members 30 which are also arranged peripherally of casing 14 but internally thereof. Both sets of flaps are pivotally mounted to the upstream lip of intake 26, by their upstream edges.

Exhaust flow duct 16 of the casing 14 terminates in a variable area propulsion nozzle 32, comprised of a plurality of flaps 34 pivotally mounted between their respective upstream and downstream ends so as to permit varying of the magnitude of the nozzle area. Each flap 34 is pivoted between its ends, rather than at its upstream end so as to reduce the moment arm effected by the gas flow thereover.

The generally annular shaped mixing device member 36 is situated in the exhaust duct at a point just downstream of the inner end of intake 26. Member 36 is axially aligned with the exhaust duct and spaced therefrom by a number of radial struts 38. A plurality of equi-angularly spaced lobes 40 are formed in the downstream end of member 36 and these lobes in operation allow columns of hot gas from engine 10 to expand radially outwardly as it passes throuh member 36, at the same time allowing columns of cold fan air or augmenter air to move radially inwards, thus providing a greater mixing periphery than would respective purely cylindrical and annular gas and air flows. Augmenter air is introduced by pivoting flap members 28,30 inwardly to the positions indicated in dotted lines in FIG. 1. In this position, the downstream ends of the flaps 30 are adjacent the upstream lip of member 36, and, in practice may even overlap it. The essential thing is to form a passage which extends from augmenter intake 26 to the downstream lip of member 36, so that augmenter air is forced between the lobes 40 of member 36 and joint flows of fan air and hot gas are forced through the lobes to achieve efficient mixing of the three flows prior to expulsion to atmosphere, via exhaust duct 16.

In order to cater for the three flow situation, variable nozzle 32 is increased in area by pivoting nozzle flaps 34 outwardly, which also creates an annular exit nozzle at 42 which together with increased area nozzle 32, is of sufficiently large area to achieve the desired propulsive effect from the flows.

The ducted fan gas turbine engine power plant 8 described herein would be used to power an aircraft and, during operation of the aircraft, flaps 28,30 and 34 would be moved by the pilot, to positions which would provide the proper engine noise attenuation for a given flight condition. For example, if the aircraft is cruising, the flaps would be positioned such that augmenting air is excluded from exhaust duct 16 and nozzle 32 is set at its smallest cross-sectional area, as indicated in full lines in FIG. 1. The least degree of noise attenuation is thus achieved, but this is not important because the aircraft will be at cruise altitude. Moreover, substantially all of the fan air is flowing between lobes 40 thus preventing recirculation of hot gases in those spaces. When however, the aircraft is either taking off or landing, all flaps will be moved to those positions indicated by dotted lines in FIG. 1 with the result that maximum mixing of hot and cold flows is achieved, with resultant slowing of hot stream velocity which in turn achieves maximum noise attenuation.

The inner wall of casing 14 and exhaust duct 16 could be lined with sound absorbing material to further attenuate engine noise.

What we claim is:

1. An exhaust flow duct for receiving fan air and exhaust gases from a ducted fan gas turbine engine power plant, said exhaust flow duct comprising:
   an augmenter air intake positioned within the length of the exhaust flow duct and through which ambient air may flow into the exhaust flow duct;
   a flow mixing device comprising a generally annular shaped member mounted coaxially within said exhaust flow duct in radially spaced apart relationship therewith, said generally annular shaped member having its upstream end positioned downstream of said augmenter air intake and having lobes formed at least in its downstream end portion with a converging exterior surface for causing flow exterior of said annular shaped member to converge in a downstream direction and a diverging interior surface for causing flow interior of said annular shaped member to diverge in a downstream direction and to mix with the converging exterior flow downstream of said annular shaped member; and
   flap means for selectively opening and closing said augmenter air intake, said flap means being movable between a first position closing said augmenter air intake and permitting fan air and exhaust gases to respectively flow over the exterior and interior of said annularly shaped member and a second position wherein said augmenter air intake is opened to permit only ambieint air to flow over the exterior of said annular shaped member and to direct fan air and exhaust gases to flow through the interior of said annular shaped member.

2. An exhaust flow duct as claimed in claim 1 in which said flap means is pivoted at its upstream end and which extends from said exhaust flow duct to the upstream end of said annular shaped member when said flap means is moved to the second position.

3. An exhaust flow duct as claimed in claim 2 in which said flap means includes at least a pair of flap members, each pivotally connected at its upstream end with one being pivotally connected downstream of the other, said flap members being arranged to overlap one another when said flap members are moved to said second position.

4. An exhaust flow duct as claimed in claim 1 including a variable area propulsion nozzle at the extreme downstream end thereof, said variable area propulsion nozzle including a plurality of flaps each pivotally mounted between its respective upstream and downstream ends.

5. A ducted fan gas turbine engine power plant comprising:
   a core gas generator having a fan at its upstream end;
   an elongated casing surrounding said core gas generator and said fan and defining with said core gas generator a duct for fan air, said casing having a portion extending downstream of said core gas generator and defining an exhaust flow duct;
   said exhaust flow duct including an augmenter air intake positioned within its length and through which ambient air may flow into the exhaust flow duct;
   a flow mixing device comprising a generally annular shaped member mounted coaxially within said exhaust flow duct in a radially spaced apart relationship therewith, said annular shaped member having its upstream end positioned downstream of said augmenter air intake and having lobes formed at least in its downstream end portion with a converging exterior surface for causing flow exterior of said annular shaped member to converge in a downstream direction and a diverging interior surface for causing flow interior of said annular shaped member to diverge in a downstream direction and to mix with the converging exterior flow downstream of said annular shaped member; and
   flap means for selectively opening and closing said augmenter air intake, said flap means being movable between a first position closing said augmenter air intake and permitting fan air and exhaust gases to respectively flow over the exterior and interior of said annularly shaped member and a second position wherein said augmenter air intake is opened to permit only ambient air to flow over the exterior of said annular shaped member and to direct fan air and exhaust gases to flow through the interior of said annular shaped member.

6. A ducted fan gas turbine engine power plant as claimed in claim 5 in which said annular shaped member has its upstream end spaced axially downstream of said core gas generator's downstream end.

7. A ducted fan gas turbine engine power plant as claimed in claim 6 in which said augmenter air intake is positioned generally radially outwardly of the core gas generator's downstream end.

8. A ducted fan gas turbine engine power plant as claimed in claim 7 in which said flap means is pivoted at its upstream end and which extends from said exhaust flow duct to the upstream end of said annular shaped member when said flap means is moved to the second position.

9. A ducted fan gas turbine engine power plant as claimed in claim 8 in which said flap means includes at least a pair of flap members, each pivotally connected at its upstream end with one being pivotally connected downstream of the other, said flap members being arranged to overlap one another when said flap members are moved to said second position.

10. A ducted fan gan turbine engine power plant as claimed in claim 5 including a variable area propulsion nozzle at the extreme downstream end of said exhaust flow duct, said variable propulsion nozzle including a plurality of flaps each pivotally mounted between its respective upstream and downstream ends.

* * * * *